UNITED STATES PATENT OFFICE.

JOSEPH KOETSCHET, OF ST. FONS, FRANCE, ASSIGNOR TO LA SOCIÉTÉ CHIMIQUE DES USINES DU RHÔNE, ANCIENNEMENT GILLIARD, P. MONNET ET CARTIER, OF LYONS, FRANCE.

ACETONE COMPOUND OF NITRO-META-TOLUYLIC ALDEHYDE.

SPECIFICATION forming part of Letters Patent No. 662,076, dated November 20, 1900.

Original application filed June 3, 1899, Serial No. 719,298. Divided and this application filed June 6, 1900. Serial No. 19,200.

(No specimens.)

*To all whom it may concern:*

Be it known that I, JOSEPH KOETSCHET, chemist, of St. Fons, near Lyons, France, have invented certain new and useful Improvements in the Production of a New Condensation Product of Nitro Toluylic Aldehyde, of which the following is a specification.

This invention has reference to the manufacture of a new condensation product of nitro meta toluylic aldehyde, particularly applicable for use in the manufacture of indigo coloring-matters.

I have discovered that when meta toluylic aldehyde is nitrated a mixture of nitro products is obtained varying in proportion according to the conditions of nitration. From this mixture I have isolated a mono-nitro toluylic aldehyde crystallizing in yellow needles, which when pure melts at 43° to 44° centigrade, (uncorrected.) This nitro aldehyde combines with acetone under the influence of suitable condensation agents to form a ketone, which is the new condensation product to which the present application relates. The nitro toluylic aldehyde above described forms the subject of an application for patent of even date herewith, Serial No. 19,198.

The nitration of the meta toluylic aldehyde to produce the nitro aldehyde which is to be condensed with acetone to form the new condensation product is preferably carried out under the following conditions; but these conditions may be varied: Two kilos meta toluylic aldehyde are dissolved in twenty kilos concentrated sulfuric acid (ninety-eight per cent.) at a temperature of about 40° centigrade, and to this solution is added, with constant stirring, 1.44 kilos dry nitrate of soda. The temperature is maintained at 40° to 45° centigrade, and when the reaction is finished the nitrated mixture is poured upon ice. The oily mixture of nitro aldehydes is separated by decantation, washed with water, a small quantity of nitro toluylic acid which is formed removed by means of carbonate of soda, and the product again well washed with water. About two and one-half kilos crude nitro aldehyde may thus be obtained. The crude nitration product is then fractionally distilled in vacuum, and at a pressure of two millimeters nearly the whole distils over between 135° and 145° centigrade. The first two-thirds of the distillate are collected apart and may be treated in the manner described in another application of even date herewith, Serial No. 19,199, to obtain a crystalline nitro aldehyde melting at 64° centigrade, (uncorrected.) The last third of the distillate is collected apart and cooled at 0° centigrade, when a crystalline mass of the nitro toluylic aldehyde melting at 43° to 44° centigrade is formed and removed from the mother-liquor by filtration at 0° centigrade.

The method of separation from the crude nitrated toluylic aldehyde of the crystalline nitro product melting at 43° to 44° centigrade is merely given as typical and may be modified in detail as the proportion of this nitro product in the crude material may require.

In order to prepare the new condensation product to which the present application relates, I proceed, preferably, as follows: I dissolve five parts of the nitro toluylic aldehyde, melting at 43° to 44° centigrade, in an excess (about eight parts) of acetone, cooled to 0° centigrade, and I add, with constant agitation, a solution of one and one-half parts of caustic soda in one hundred parts water. When the operation (which occupies about thirty minutes) is completed, the mixture is acidified and the excess of acetone removed by distillation. The ketone condensation product remains as an oily mass, which becomes crystalline when purified by crystallization from ether, benzene, alcohol, or other solvent. In either case the yield of the ketone is nearly theoretical, and when pure the new product melts at about 104° centigrade. Agitated with a weak aqueous solution of alkali in the presence of air or other suitable oxidizing agent an indigo coloring-matter which dyes a reddish hue is precipitated.

What I claim, and desire to secure by Letters Patent, is—

As a new product an acetone condensation product of nitro-meta-toluylic aldehyde which crystallizes from ether, benzene, and alcohol, and when pure melts at about 104° centigrade and when agitated with a weak aqueous solution of alkali in the presence of air or other suitable oxidizing agent yields an indigo coloring-matter dyeing a reddish hue.

In witness whereof I have hereunto signed my name in the presence of two subscribing witnesses.

JOSEPH KOETSCHET.

Witnesses:
   RODOLPHE PFISTER,
   EMIL MARQUETANT.